Figure 1:
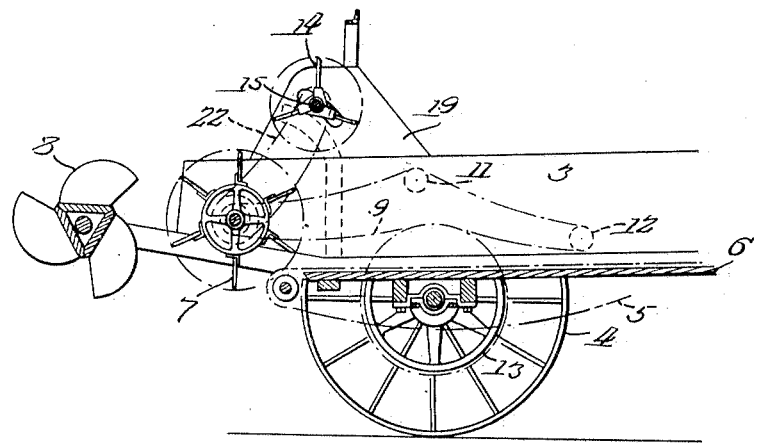

C. R. DAVIS.
FERTILIZER DISTRIBUTER.
APPLICATION FILED JULY 3, 1916.

1,315,818. Patented Sept. 9, 1919.

Inventor:
Calvin R. Davis
By Pond & Wilson
Attys.

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

FERTILIZER-DISTRIBUTER.

1,315,818.  Specification of Letters Patent.  Patented Sept. 9, 1919.

Original application filed April 11, 1916, Serial No. 90,483. Divided and this application filed July 3, 1916. Serial No. 107,316.

*To all whom it may concern:*

Be it known that I, CALVIN R. DAVIS, a citizen of the United States, residing at Rockford, in the county of Winnebago and State of Illinois, have invented certain new and useful Improvements in Fertilizer-Distributers, of which the following is a specification.

This application, a division of my application Ser. No. 90,483, filed April 11, 1916, relates to the distributing beaters of a fertilizer distributer.

Fertilizer such as manure may be classed in different grades according to the weight and character thereof. When the manure is heavy and dense it is most practical to load the same on an ordinary fertilizer distributer to a maximum height of about 18 inches, whereas when the manure is very light it may be loaded as high as 36 inches. In addition to the main distributing beater or cylinder, upper beaters have been employed for operation on the upper stratum of manure so as to make possible the distribution of a load of manure piled higher than the main beater. But so far as I am aware, the arrangement of such upper beater with respect to the load and to the lower beater has not been such as will permit of most effective distribution.

The primary object of my invention is to provide in a fertilizer distributer in combination with a lower beater, an upper beater mounted so as to be capable of vertical adjustment with respect to the lower beater within a range of movement which will enable said upper beater to operate both below and above the uppermost point of the teeth of the lower beater. In other words, I have provided means whereby the upper beater may be vertically adjusted according to the character of the manure and the height to which it is loaded for the purpose of securing most effective disintegration and distribution. By so adjusting the upper beater, that is, to a relatively high position for light manure piled high and to a considerably lower position for heavy manure in a low pile, the strain on the upper and lower beaters is proportionally distributed and equalized, and in addition the manure is better disintegrated and distributed because each beater is operating on a proper amount of manure and is not crowded or overloaded.

Referring to the drawing,—

Figure 2:
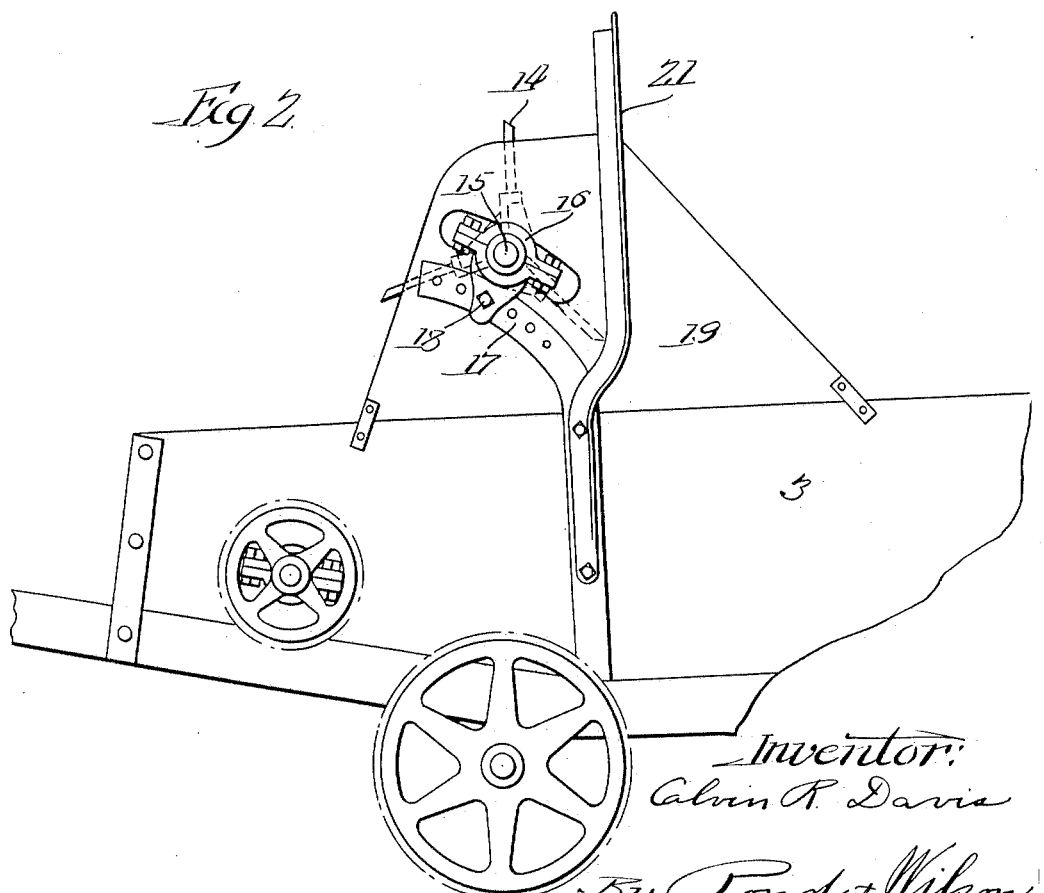

Figure 1 is a longitudinal sectional view through the rear end of a fertilizer distributer embodying my improvements; and Fig. 2 is an enlarged side view of a rear portion of the fertilizer distributer.

My improvements may be embodied in any fertilizer distributer adapted for distributing manure employing a rear distributing cylinder or beater. In the drawing I have illustrated somewhat diagrammatically the rear portion of a fertilizer distributer of conventional design comprising well known parts such as the fertilizer box 3 supported at its rear ends by carrying wheels 4, an endless apron represented by the character 5 adapted to be moved along the bed 6 of the fertilizer box to carry the manure to the main beater or distributing cylinder 7 mounted on the rear end of the box. A wide spread attachment 8 may be mounted on the side sills of the box rearwardly of the main beater to effect further disintegration and wider distribution of the manure. The main beater may be driven from one of the carrying wheels by suitable means, such as by an endless chain 9 trained over a sprocket wheel on the beater shaft, and over sprocket wheels 11 and 12 and engaging the drive sprocket 13 on the carrying wheel axle. By raising and lowering the sprocket 12 as is well known in the art, the chain 9 may be moved into and out of engagement with the sprocket wheel 13 to put the beater into and out of operation. All of these parts, well known in the art, may be of suitable design, and it should be understood that my invention is not restricted to any particular form of fertilizer feed, beater or driving mechanism or has any direct connection with the wide spread attachment shown.

My invention provides in combination with the main or lower beater, an upper beater 14 disposed forwardly of the lower beater and mounted so as to be vertically adjustable a substantial distance for a purpose which will be presently apparent. The shaft 15 which carries this beater is journaled at its ends in bearings 16 which are adjustably mounted on arcuate supports 17 secured to the outer sides of the fertilizer box. The adjustable connection between the bearings 16 and the supports 17 may be through the intermediary of bolts 18 adapted to be located in any of a series of holes in the supports 17 which are arranged substantially concentric with the main beater shaft in a manner to enable a substantial range of vertical adjustment of the upper beater relatively to the lower beater. Side guards 19 prevent lateral displacement of the manure from the upper beater and an angle iron brace 21 secured to the sides of the box spans at the top thereof and holds the supports 17 in fixed relative relation. An endless chain 22 connects sprocket wheels on the upper and lower beater shafts, establishing a driving connection between the two beaters.

It will be noted viewing Fig. 1, that the uppermost point of operation of the lower beater and the lowermost point of the upper beater are substantially on a level with the top of the fertilizer box. The depth of an ordinary box is about 18 inches and when heavy manure is piled into the box level with the top thereof a considerable strain is imposed on the lower beater, since the entire work of disintegrating and distributing the manure would fall on this beater. With my improvements, the upper beater may be lowered so as to penetrate about 2 inches into a bed of manure piled 18 inches high so as to remove and distribute the top layer of manure, and consequently relieve the lower beater on an unduly heavy strain. Should the manure be piled higher or be of a lighter grade to warrant a heavier load it will be obvious that since each beater operates on a proportional amount of the load, the working strain and duty of the beaters are divided, each beater doing its own share of the work and the upper beater being raised if necessary in accordance with the circumstances. When it is desired to distribute light manure or straw it may be piled as high as 36 inches, side-boards being employed in this instance to give the fertilizer box required depth, and the upper beater is adjusted to its uppermost position. In this position the lowermost point of the beater will be substantially two inches above the highest point of the lower beater and because of the character of the manure each beater may effectively handle a greater amount.

With regard to the adjustment of the upper beater to different elevations in accordance with the different grades of fertilizer it will be noted that, due to the peculiar mounting of the upper beater, the operativeness of the direct chain connection between the upper and lower beaters is not affected when any adjustment of this connection is made. In other words, the upper beater may be adjusted from its lowest to its highest position on the arcuate supports 17 and, due to the fact that these supports are arranged substantially concentric to the center of the main beater, there is no change in distance between the centers of the two beaters such as might necessitate the removal or addition of links in the chain or the employment of a chain tightener to compensate for such change.

It will thus be seen that by means of my improvements the upper beater may be easily adjusted vertically through a substantial range of movement to accommodate the beaters to the varied working conditions. By such provision various types of manure may be distributed in a most effective and efficient manner and the distributing mechanism is not unduly strained as might be the case if it could not be set for the particular type of manure to be distributed.

I claim:

1. In a fertilizer distributer, the combination of a main distributing beater, means for moving a bed of fertilizer rearwardly toward said beater, a second distributing beater positioned above and forwardly of the main beater and adapted to be adjusted vertically to different elevations for penetrating the top of a bed of fertilizer to different depths according to the character of the fertilizer; means adjustably holding the second beater comprising bearings in which the ends of the beater shaft are journaled, bearing supporting members in fixed connection with the sides of the distributer body and each having a series of spaced holes at different elevations in an arcuate path substantially concentric with the center of the main beater, and fastening means adapted to be passed through any of said holes for holding the bearings rigidly in any adjusted position; and an endless chain connecting the beaters.

2. In a fertilizer distributer, the combination of a fertilizer box, a main distributing beater mounted at the rear end of the box, means for moving a bed of fertilizer rearwardly in the box, an upper distributing beater, supporting members for the upper beater fixedly secured to the sides of the box and providing beater-supporting portions forwardly of and above the main beater and having a series of spaced holes at different elevations in an arcuate path substantially concentric with the center of the main beater, bearing brackets in which the ends of the upper beater are journaled, fixed means engageable in any of said openings for holding the upper beater at different elevations, and an endless chain connecting the beaters.

CALVIN R. DAVIS.